United States Patent [19]

Saleh et al.

[11] Patent Number: 5,326,791
[45] Date of Patent: Jul. 5, 1994

[54] PROCESS FOR SEPARATION OF HYDROLYZABLE FROM NON-HYDROLYZABLE WASTE PLASTICS FOR RECOVERY OF STARTING MATERIALS AND OTHER CONVERSION PROCESSES, RESPECTIVELY

[75] Inventors: Ramzi Y. Saleh, Flemington; William E. Wellman, Edison, both of N.J.

[73] Assignee: Exxon Research and Engineering Company, Florham Park, N.J.

[21] Appl. No.: 812,176

[22] Filed: Dec. 20, 1991

[51] Int. Cl.$^5$ .............................................. C08J 11/14
[52] U.S. Cl. ..................................... 521/45; 528/481; 528/499
[58] Field of Search ................... 528/481, 499; 521/45

[56] References Cited

U.S. PATENT DOCUMENTS

| 3,083,193 | 3/1963 | Kolner | 525/383 |
| 4,439,601 | 3/1984 | McCurdy et al. | 528/481 |
| 4,458,064 | 7/1984 | Chatterjee | 528/481 |

Primary Examiner—Joseph L. Schofer
Assistant Examiner—Tom Weber
Attorney, Agent, or Firm—Linda M. Scuorzo

[57] ABSTRACT

The present invention relates to a process for reactively separating hydrolyzable polymers, such as PET, in mixtures of the polymer and certain non-hydrolyzable polymers, specifically polyolefins by converting the hydrolyzable polymers to their corresponding water soluble components (e.g., PET to ethylene glycol and terephthalic acid) in the presence of liquid water at temperatures from about 200° C. up to the critical temperature of water and autogenous pressure. The process has utility in recycling and waste material separation processes.

5 Claims, No Drawings

PROCESS FOR SEPARATION OF HYDROLYZABLE FROM NON-HYDROLYZABLE WASTE PLASTICS FOR RECOVERY OF STARTING MATERIALS AND OTHER CONVERSION PROCESSES, RESPECTIVELY

BACKGROUND OF THE INVENTION

1. Field of the Invention

The process of the present invention constitutes a means for the reactive separation of hydrolyzable polymers such as polyethylene terephthalate resins ("PET"), polyamides, polycarbonates, polyethers, poly-acrylonitriles in mixtures with polyolefins such as polypropylene ("PP") and polyethylene ("PE") by selectively converting the hydrolyzable polymers to their starting materials, e.g., PET to terephthalic acid ("TPA") and ethylene glycol ("EG"). Selective conversion is carried out by heating the starting mixture of neutral liquid water, hydrolyzable polymers, preferably PET, polyamides, polycarbonates, polyethers and polyacrylonitriles, and other non-hydrolyzable polyolefins such as PP and PE at from about 200° C. up to the critical temperature of water, which is about 374° C. at autogenous pressure.

2. Discussion of Related Art

The hydrolysis of high molecular weight condensation polymers such as PET in the absence of added acids or bases, is well known in the art. When, for example the condensation polymer is PET, the primary hydrolysis products are TPA and EG, see, e.g., U.S. Pat. No. 4,578,510, U.S. Pat. No. 4,605,762, U.S. Pat. No. 4,620,032 and U.S. Pat. No. 3,120,561. However, the art does not teach nor suggest a process for the reactive separation of condensation polymers such as PET, polyamides, polycarbonates, polyethers, polyvinylchlorides, and polyacrylonitriles from mixtures containing other polymer resins by hydrolyzing the condensation polymer into its water-soluble components in the presence of neutral liquid water as a starting material in the absence of any externally supplied acids or bases and at autogenous pressure.

SUMMARY OF THE INVENTION

This invention relates to a process for the reactive separation of hydrolyzable polymers, such as PET, polyamides, polycarbonates, polyethers, polyvinylchlorides, and polyacrylonitriles in mixtures with polyolefins such as PP and PE by selectively converting PET to TPA and EG by contacting the mixture with neutral liquid water as a starting material (pH equals 7.0) at a temperature preferably from about 200° C. to about 310° C., more preferably from about 250° C. to about 300° C. at the pressure generated by the mixed components of the system at the corresponding temperature ("autogenous pressure"). The products resulting from the conversion of the products remain in the hot liquid water phase and may be separated.

DETAILED DESCRIPTION OF THE INVENTION

All materials used herein may be obtained from commercial sources.

The hydrolyzable polymers are preferably PET, polyamides, polycarbonates, polyethers, and polyacrylonitriles polymers in mixtures with non-hydrolyzable polymers, preferably polyolefins such as PP, PE alone or in mixtures thereof. As used herein, "hydrolyzable" refers to decomposition of the C—O bonds in the backbone of a polymer by hydrolysis under the conditions of the present invention.

In the starting mixture, the hydrolyzable and nonhydrolyzable polymers may be present in any form that can be accommodate by the reaction vessel, thus powders crystals, small chips are acceptable. The selective reactive separation of the PET, polyamides, polycarbonates, polyethers, and poly acrylonitriles (collectively referred to herein as "hydrolyzable polymers") in a mixture of the hydrolyzable polymers and non-hydrolyzable polymers, specifically polyolefins such as PP and PE and selective reactive polyolefins e.g., is carried out by contacting the starting materials of the non-hydrolyzable and hydrolyzable polymers and neutral liquid water at a temperature of preferably from about 200° C. up to the critical temperature of water, which is about 374° C., preferably from about 200° C. to about 350° C., more preferably from about 225° C. to about 325° C. for a time sufficient to convert the hydrolyzable polymer(s) to corresponding water soluble components. The identity of such components are well known to one ordinarily skilled in the art. Polyolefins in the mixture are not hydrolyzable polymers at the reaction conditions of the process of the present invention.

The amount by weight of water to polymer should be from about 1:1–20:1, preferably from about 2:1–10:1. The reaction is carried out at autogenous pressure (i.e., vapor) the pressure generated by the mixed components system at the given reaction temperature which typically, for liquid water alone will be from about 225.45 psi at 200° C. to about 2397.79 psi at 350° C. It is within the skill of one ordinarily skilled in the art to determine such pressures, and the pressure of liquid water in the above temperature range may be determined by reference to standard tests. See, e.g., CRC Handbook of Chemistry and Physics, 61st Edition, p. D-197 (1980–1981).

In the process of the present invention, liquid water, the hydrolyzable polymers, and the non-hydrolyzable polymers are the only starting materials. The products resulting from contacting the starting materials of the polymers and neutral liquid water under the reaction conditions of the present invention are such that the hydrolyzable polymers produce products that are soluble in hot water and, thus, remain in the hot liquid water phase, while the non-hydrolyzable polymers (polyolefins) form a separate, solid phase. The two phases may be separated by any means known to one skilled in the art, for example, by filtration, by such contact and thus are present as a separate, solid phase. For example, when the starting mixture contains PET, PE and PP, and neutral liquid water the contacting reactively separates the PET by producing TPA and EG that remain in the aqueous layer; the PP and PE are not hydrolyzed by such contacting. The products of PET hydrolysis, TPA and EG, are recoverable from the hot liquid water phase layer.

The process has utility in plastics recycling by providing a simple method for differentiating by reactive separation hydrolyzable polymers from which starting materials can be recovered from other non-hydrolyzable polymers (polyolefins) which then can be used in conversion processes, and has utility as a method for reactive purification of non-hydrolyzable polymers (polyolefins) so that they can be used in other conversion processes.

The process of the present invention may be understood by reference to the following examples.

EXAMPLE 1

A mixture of PET (plastic soda containers), polyamides (nylon), and polycarbonates was cut into small pieces and placed in a minibomb with an approximately five-fold excess by weight of water to the total amount by weight of polymer. The temperature was raised to approximately 315° C. for 2 hours. At the end of the 2-hour period, the hot liquid phase containing the hydrolysis products, terephthalic acid and ethylene glycol, was separated from the solid phase which contained the polyolefins.

EXAMPLE 2

The procedures of Example 1 were repeated, except that the temperature was raised to 350° C. As in Example 1, the temperature was raised to approximately 350° C. for 2 hours. At the end of the 2-hour period, the hot liquid water phase containing the hydrolysis products, terephthalic acid and ethylene glycol, was separated from the solid phase which contained the polyolefins.

What is claimed is:

1. A process for the reactive separation of certain hydrolyzable polymers from certain non-hydrolyzable polymers in mixtures thereof, comprising:
    (a) contacting the starting materials of neutral liquid water and a mixture of non-hydrolyzable polymers selected from the group consisting of polyolefins and hydrolyzable polymers;
    (b) heating the starting materials to a temperature of from about 200° C. up to the critical temperature of water at autogeneous pressure for a time sufficient to selectively convert the hydrolyzable polymers to corresponding water-soluble components; and
    (c) separating the water soluble components from the non-hydrolyzable polymers at reaction conditions in (b).
2. The process of claim 1 wherein the polyolefins are selected from the group consisting of polypropylene and polyethylene.
3. The process of claim 1 wherein the temperature is from about 200° C. to about 350° C.
4. The process of claim 1 wherein the temperature is from about 225° C. to about 325° C.
5. The process of claim 1 wherein the hydrolyzable polymers are selected from the group consisting of polyethylene terephthalate, polyamides, polycarbonates, polyethers, and polyacrylonitriles.

* * * * *